US012619767B2

(12) United States Patent
Kunzmann et al.

(10) Patent No.:  US 12,619,767 B2
(45) Date of Patent:  May 5, 2026

(54) ENHANCED METHOD OF CONTROL OR MANAGEMENT OF USER RELATED DATA SUBJECT TO USER CONSENT

(71) Applicant: Nokia Technologies Oy, Espoo (FI)

(72) Inventors: Gerald Kunzmann, Munich (DE); Shubhranshu Singh, Seeheim-Jugenheim (DE); Yannick Lair, Voisins le Bretonneux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 346 days.

(21) Appl. No.: 18/041,478

(22) PCT Filed: Jul. 30, 2021

(86) PCT No.: PCT/EP2021/071430
§ 371 (c)(1),
(2) Date: Feb. 13, 2023

(87) PCT Pub. No.: WO2022/033897
PCT Pub. Date: Feb. 17, 2022

(65) Prior Publication Data
US 2023/0297717 A1      Sep. 21, 2023

Related U.S. Application Data

(60) Provisional application No. 63/064,990, filed on Aug. 13, 2020.

(51) Int. Cl.
*G06F 21/62*        (2013.01)
*G06F 21/64*        (2013.01)

(52) U.S. Cl.
CPC .......... *G06F 21/6245* (2013.01); *G06F 21/64* (2013.01)

(58) Field of Classification Search
CPC ... G06F 21/6245; G06F 21/64; H04L 67/562; H04L 67/306; H04W 12/08; H04W 12/082; H04W 12/084
See application file for complete search history.

(56) References Cited

U.S. PATENT DOCUMENTS

2020/0137572 A1* 4/2020 Lee ......................... H04W 4/60
2020/0359218 A1* 11/2020 Lee ....................... H04M 15/55
2021/0099880 A1* 4/2021 Holt .................... H04W 12/082
(Continued)

FOREIGN PATENT DOCUMENTS

WO      2018/162989 A1      9/2018
WO      2020/144455 A1      7/2020

OTHER PUBLICATIONS

"3rd Generation Partnership Project; Technical Specification Group Services and System Aspects; Study on enablers for network automation for the 5G System (5GS); Phase 2 (Release 17)", 3GPP TR 23.700-91, V0.4.0, Jun. 2020, pp. 1-186.
(Continued)

*Primary Examiner* — Andrew Suh
(74) *Attorney, Agent, or Firm* — Carter, DeLuca & Farrell LLP

(57) ABSTRACT
Systems, methods, apparatuses, and computer program products for supporting user consent management, tracking of user specific data and UE specific data requiring user consent, and distributing information about revocation of the user consent to involved network entities, are provided.

1 Claim, 8 Drawing Sheets

(56) References Cited

U.S. PATENT DOCUMENTS

| | | | | |
|---|---|---|---|---|
| 2021/0368326 A1* | 11/2021 | Strand | .................... | H04W 4/60 |
| 2022/0039046 A1* | 2/2022 | Ianev | ................... | H04W 60/00 |
| 2022/0103434 A1* | 3/2022 | Crowder | ................ | H04L 41/28 |
| 2023/0071081 A1* | 3/2023 | Hong | ................... | H04L 41/142 |

OTHER PUBLICATIONS

"3rd Generation Partnership Project; Technical Specification Group Services and System Aspects; Architecture enhancements for 5G System (5GS) to support network data analytics services (Release 16)", 3GPP TS 23.288, V16.3.0, Mar. 2020, pp. 1-62.

"3rd Generation Partnership Project; Technical Specification Group Services and System Aspects; Architecture enhancements for 5G System (5GS) to support network data analytics services (Release 16)", 3GPP TS 23.288, V16.4.0, Jul. 2020, pp. 1-66.

Invitation to Pay Additional Fees received for corresponding Patent Cooperation Treaty Application No. PCT/EP2021/071430, dated Sep. 27, 2021, 16 pages.

"Updates to Solution 1 for Network Data Analytics Feedback", SA WG2 Meeting #129, S2-1811076, Agenda Item: 6.11, Huawei, Oct. 15-19, 2018, 3 pages.

"eNA KI-13 new solution—User consent for UE analytics", SA WG2 Meeting #129bis, S2-1811767, Agenda Item: 6.11, NEC, Nov. 26-30, 2018, 2 pages.

International Search Report and Written Opinion received for corresponding Patent Cooperation Treaty Application No. PCT/EP2021/071430, dated Nov. 17, 2021, 23 pages.

"3rd Generation Partnership Project; Technical Specification Group Services and System Aspects; System architecture for the 5G System (5GS); Stage 2 (Release 18)", 3GPP TS 23.501, V18.0.0, Dec. 2022, pp. 1-593.

"3rd Generation Partnership Project; Technical Specification Group Services and System Aspects; Security architecture and procedures for 5G system (Release 18)", 3GPP TS 33.501, V18.0.0, Dec. 2022, pp. 1-292.

"User consent for network analytics", 3GPP TSG-WG SA2 Meeting #145E e-meeting, S2-2106640, Nokia, May 17-28, 2021, 14 pages.

"3rd Generation Partnership Project; Technical Specification Group Services and System Aspects; Procedures for the 5G System (5GS); Stage 2 (Release 18)", 3GPP TS 23.502, V18.0.0, Dec. 2022, pp. 1-773.

"3rd Generation Partnership Project; Technical Specification Group Services and System Aspects; Study on User Consent for 3GPP services (Release 17)", 3GPP TR 33.867, V17.1.0, Mar. 2022, pp. 1-32.

"LS on User consent", 3GPP TSG-SA3 Meeting #103-e, S3-212123, SA3, May 17-28, 2021, 4 pages.

* cited by examiner

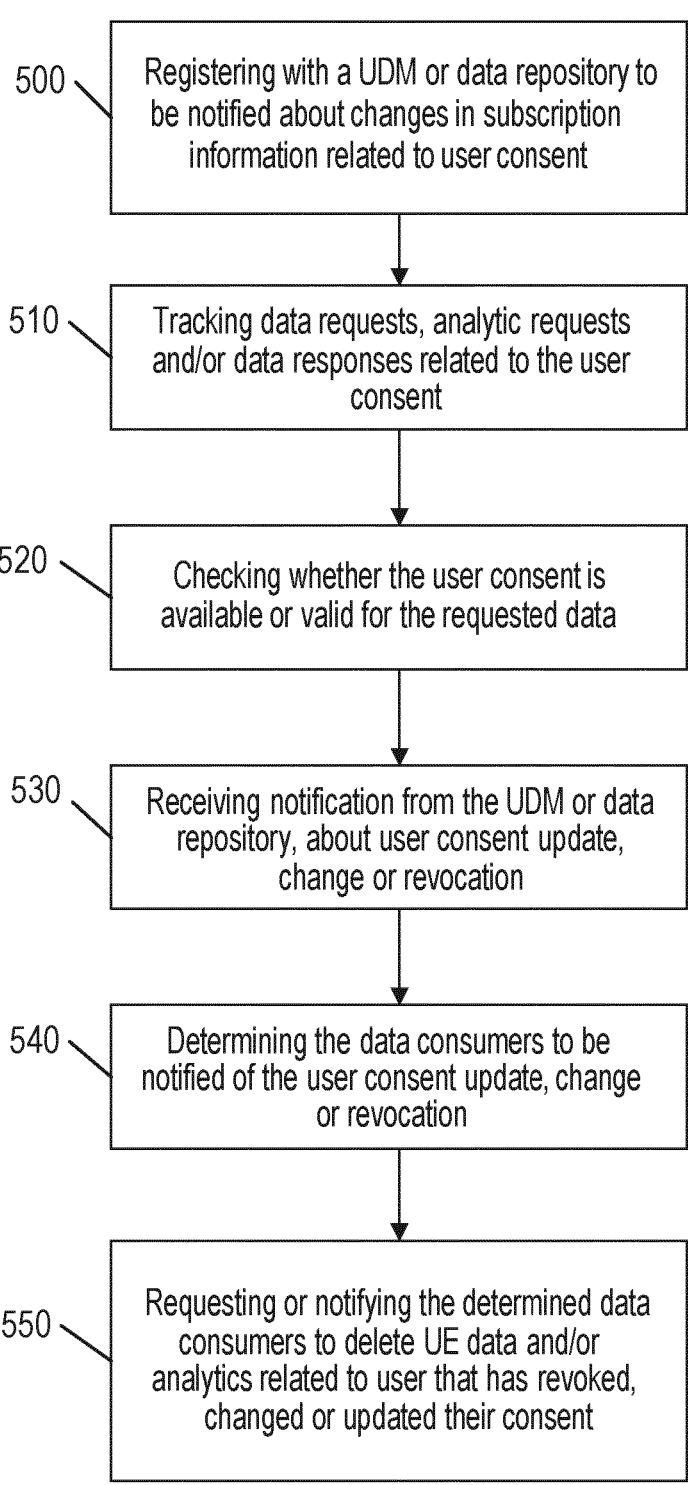

500   Registering with a UDM or data repository to be notified about changes in subscription information related to user consent 510   Tracking data requests, analytic requests and/or data responses related to the user consent 520   Checking whether the user consent is available or valid for the requested data 530   Receiving notification from the UDM or data repository, about user consent update, change or revocation 540   Determining the data consumers to be notified of the user consent update, change or revocation 550   Requesting or notifying the determined data consumers to delete UE data and/or analytics related to user that has revoked, changed or updated their consent

Fig. 5

ENHANCED METHOD OF CONTROL OR MANAGEMENT OF USER RELATED DATA SUBJECT TO USER CONSENT

RELATED APPLICATION

This application was originally filed as PCT Application No. PCT/EP2021/071430, filed on Jul. 30, 2021, which claims priority from U.S. Provisional Application No. 63/064,990, filed on Aug. 13, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for supporting user consent management, tracking of user specific data and UE specific data requiring user consent, and distributing information about revocation of the user consent to the involved network entities in such communications systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein:

FIG. 5 illustrates an example flow diagram of a method, according to one example embodiment;

DETAILED DESCRIPTION

Figures 1A, 1B, 2:
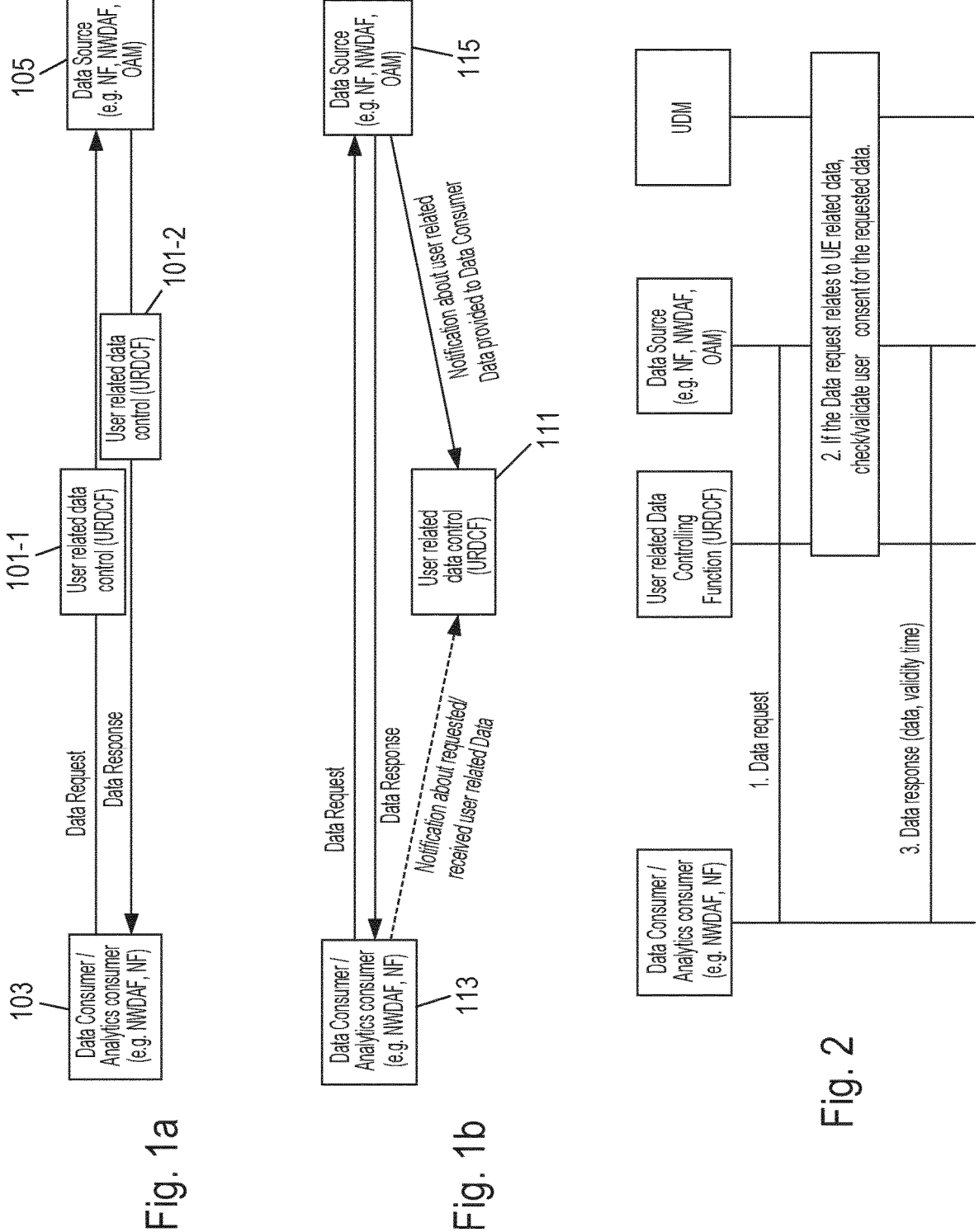
FIG. 1a illustrates an example block diagram of a user/UE related data control and/or management deployment architecture, according to certain embodiments.
FIG. 1b illustrates an example block diagram of a user/UE related data control and/or management deployment architecture, according to certain embodiments.
FIG. 2 illustrates an example signaling flow diagram, according to one example embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for tracking the usage of UE specific or user specific data and supporting user consent updates and/or revocation, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

$3^{rd}$ generation partnership project (3GPP) has specified architecture enhancements for the 5G System (5GS) to support network data analytics services. One identified issue for enhancements to enablers for network automation for the 5GS relates to user consent for UE data collection or analysis. For example, solutions may be needed relating to improving the collection, validation and checking of user consent to process UE related data. As will be described herein, certain example embodiments may be directed to systems and methods relating to the updating and/or revocation of user consent.

User consent may be required in order to store and process UE specific or user specific data as part of network data analytic services. Such user consent may be assumed to be collected by the operator and may be provided as part of the subscription data, which may be stored in a data repository (e.g., UDR). According to certain jurisdictions' laws or requirements, user consent can only be collected for a certain purpose and the user consent would need to be obtained again if the user data is to be used for another purpose. Furthermore, the user may also revoke their consent at any time, which may require one or more actions. For example, it should be ensured that the revocation is distributed to the involved network entities, such that the entities do not continue to process the data that is subject to user consent based on outdated information about the user consent. In addition, when user consent is revoked, the data needs to be deleted from the involved network entities, such as the data repositories, where the data may be cached for more efficient data collection. It also may require to delete or update certain already processed analytics that had been performed based on the earlier user consent, such as user data congestion for a specific UE or UE presence pattern analytics. It may be assumed that the revocation of the user consent to process the UE data also applies to any UE related data that had been collected during the period where the user consent had been applicable.

In order to be able to execute the above-described actions, a method is needed to track entities that retrieve, store, and/or process data that is covered by the user consent, so that based on this information those entities can be actively requested to delete data and corresponding analytics in case of a revocation of the user consent. Additionally or alternatively, entities that store and/or process the data may need to periodically check whether the user consent is still valid for any of the stored data or analytics.

Certain example embodiments provide solutions for at least the above-identified problems relating to the revocation of or updates to user consent for network data analytics service, as well as possible other problems or issues. One example embodiment provides an entity or function that is configured to keep track of other entities in the system that are collecting, storing, and/or processing UE related data that may fall under the scope of the user consent. Some example embodiments provide a request/response based procedure and notification messages between the tracking entity and the other entities that collect, store and process user data. Further, an example embodiment may provide a validity time attribute that the entity/entities collecting the user data may return to the tracking entity to inform about the maximum time the entity/entities are allowed to store the data and/or the related output analytics.

One example embodiment may include a user/UE related data control and/or management deployment architecture. FIG. 1a and FIG. 1b illustrate an example block diagram of a user/UE related data control and/or management deployment architecture, according to certain embodiments. As illustrated in the examples of FIGS. 1a and 1b, an entity tracking UE related and/or user related data that is subject to the user consent, e.g., a user/UE related data controlling entity, may be placed as a kind of proxy in-between the data consumer and the data source. In some embodiments, the entity tracking UE related and/or user related data may be referred to herein as a user/UE related data controlling function (URDCF), but example embodiments are not limited to this terminology. A URDCF, as used herein, may refer to any entity, node or function that is capable of tracking, controlling and/or managing UE related and/or user related data, e.g., data that is subject to user consent. In addition, as used herein, the term "user data" or "user related data" may refer to one or more of user related data, UE related data, UE data, or the like.

According to an embodiment, a URDCF may be aware of any UE related data provided to the data consumer(s). According to a further embodiment, URDCF may be aware of any UE related data requested from the data consumer(s). In some embodiments, the data consumer(s) may include, for example, an analytics consumer, network function (NF) and/or network data analytics function (NWDAF).

It is noted that an NWDAF may refer to an entity configured to provide a data consumer or consumer NF with analytics that assist in control decisions. The NWDAF can collect input data by subscribing to event-based or timer-based notifications from source NFs and/or the operations, administration and maintenance (OAM). The NWDAF may be configured to produce analytics outputs based on the collected inputs, and to deliver these analytics outputs to a data consumer or NF.

As illustrated in the example of FIG. 1a, a URDCF 101-1 may be placed as a proxy on the data request path between the data consumer 103 and data source 105. In an additional or alternative embodiment, as also illustrated in the example of FIG. 1a, a URDCF 101-2 may be placed as a proxy on the data collection/data response path between the data source 105 and the data consumer 103. Therefore, according to certain example embodiments, a URDCF 101-1, 101-2 may be placed as proxy on the data request path and/or on the data response path. In some example embodiments, if placed on the data request path, the URDCF 101-1, 101-2 may be co-located with a data collection coordination function (DCCF). According to a further embodiment, the URDCF 101-1, 101-2 may be co-located with and/or provided by the data source.

It is noted that DCCF may refer to a control-plane entity that coordinates data collection and triggers data delivery to data consumers. A DCCF may support multiple data sources, data consumers, and/or message frameworks. To prevent duplicate data collection, a data source may be associated with just one DCCF. The DCCF provides 3GPP defined services to data consumers (e.g., NWDAF), and data sources (e.g., NF). A DCCF needed by a data consumer can be discovered using a network repository function (NRF).

In an example embodiment, the URDCF 101-1, 101-2 may be configured to monitor the subscription data and, in case it becomes aware of a revocation of the user consent, the URDCF 101-1, 101-2 may trigger the necessary actions to inform the past data consumers about this revocation. For example, the URDCF 101-1, 101-2 may request and/or notify the data consumers to delete the user related data and analytics that are no longer covered by a user consent. According to an embodiment, the URDCF 101-1, 101-2 may actively monitor the subscription data and/or may subscribe to receive notifications of any changes to subscription data related to changes of the user consent. It is noted that "subscriptions" or "subscription data" may refer to information that may include the user consent that an operator has collected from the user, for example.

FIG. 1b illustrates another example of a user/UE related data control and/or management deployment architecture, according to some embodiments. As illustrated in the example of FIG. 1b, the URDCF 111 may be notified by the data source 115 (or alternatively by the data consumer 113) when data is provided (or requested) that requires user consent. As discussed above, the URDCF 111 may monitor the subscription data and, in case it becomes aware of a revocation of the user consent, the URDCF 111 may trigger the necessary actions as described above with respect to FIG. 1a.

While the examples of FIGS. 1a and 1b depict the URDCF as a standalone entity, the URDCF or its functionality may be performed by or incorporated in one or more of a NF, data source, data consumer, DCCF, NWDAF, AF, AMF, NRF, NEF, SMF, OAM, or other network entity. Furthermore, it should be noted that, in certain embodiments, the deployment architectures of FIGS. 1a and 1b may be combined, e.g., a URDCF may be configured as a proxy on the data request path and/or data response path and may be notified about the data provided from the data source to the data consumer (or vice versa). Accordingly, FIGS. 1a and 1b illustrate some example configurations, but other configurations are contemplated according to other embodiments.

FIG. 2 illustrates an example signaling flow diagram, according to one example embodiment. The example of FIG. 2 depicts a procedure of requesting data from a data consumer/analytics consumer (e.g., NWDAF, NF) towards a data source (e.g., AF, NWDAF). As illustrated in FIG. 2, at 1, a data consumer/analytics consumer may send a data request or data subscription (e.g., Nnf_EventExposure_Subscribe, data collection request from OAM, Nnwdaf_AnalyticsInfo_Request, or Nnwdaf_AnalyticsSubscription_Subscribe Request) to a data source. Similar to the embodiment of FIG. 1a, the data request may be proxied via a URDCF and the URDCF may store a record about the data requested. As mentioned above, a URDCF may be co-located with a DCCF or data collection NF (DCNF) and/or a URDCF may be co-located with the data source.

As further illustrated in the example of FIG. 2, at 2, if the requested data is subject to user consent, the URDCF, or the data source, may check whether the user consent is available for this request. For example, the entities may already have knowledge of the user consent (e.g., from a previous request and/or handshake procedure with the data source) or may need to check with the unified data management (UDM) to learn about the user consent information available in the subscription information (e.g., subscription data stored in the UDR).

In one example, where the embodiment of FIG. 1b is applied, optionally the data consumer or the data source may inform the URDCF about the requested data or about the data that was or will be provided to the data consumer. As also illustrated in the example of FIG. 2, at 3, if the user consent is available, the data source may provide the requested data to the data consumer (e.g., as data response/Nnwdaf_AnalyticsInfo_Request response or as notifications related to the requested subscription). According to one embodiment, this response may be proxied via the URDCF and the URDCF may store a record about the data provided.

In an example embodiment, the data source may include a validity time indicating the duration over which the user consent is valid. This validity time may also be stored at the URDCF together with the provided data. At the expiry of this validity time, the data source and/or data consumer may stop/delete corresponding data/analytics, or the data source and/or data consumer may renegotiate a new validity time, e.g., based on the above procedure 2 of FIG. 2.

It is noted that, in one embodiment, a URDCF may be a separate entity or function, as illustrated in the example of FIG. 2. However, in other example embodiments, the URDCF may represent a functionality that is performed by one or more of a NF, data source, data consumer, DCCF, NWDAF, AF, AMF, NRF, NEF, SMF, OAM, or other network entity.

Figure 3A:
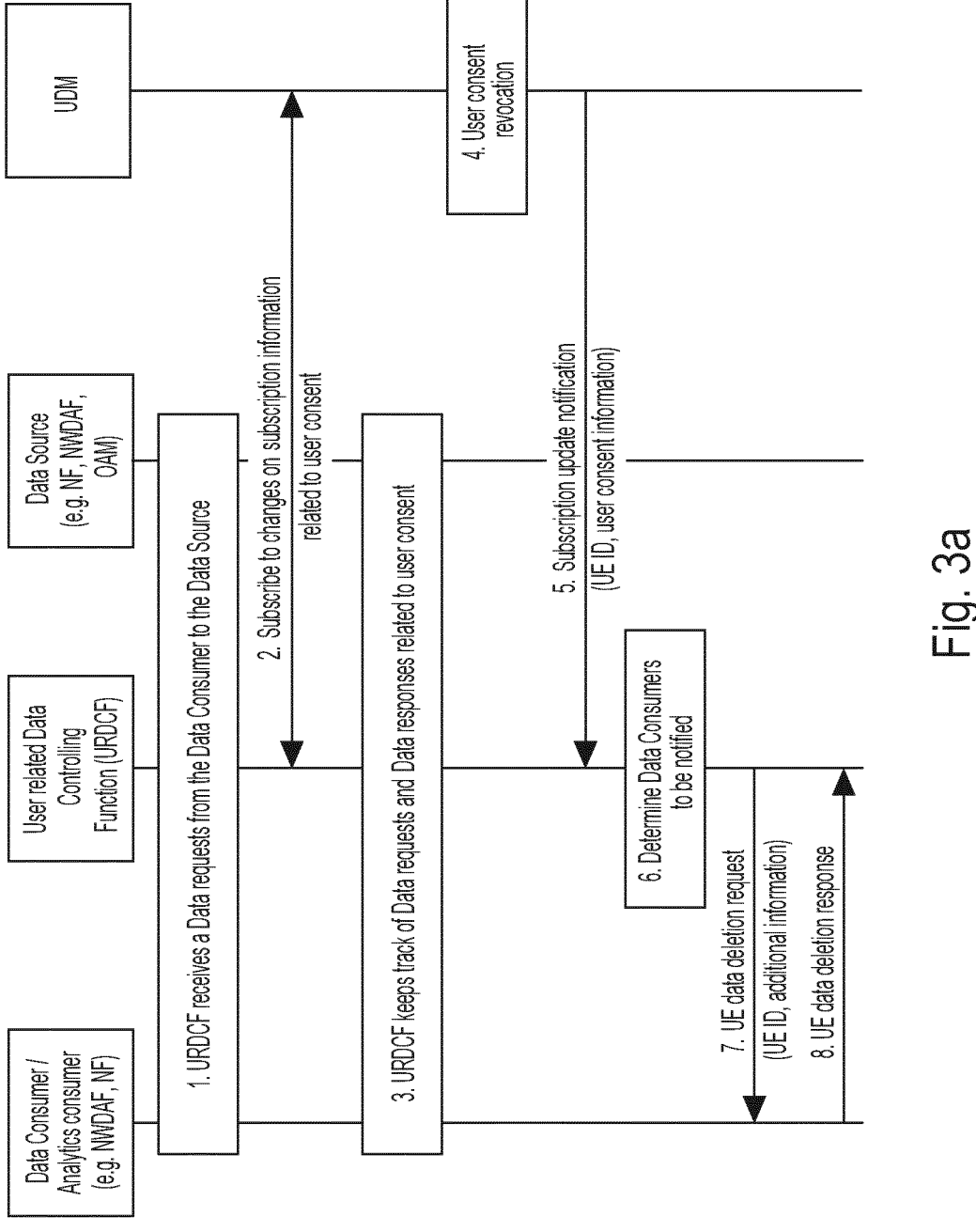
FIG. 3a illustrates an example signaling flow diagram, according to one example embodiment.

FIG. 3a illustrates an example signaling flow diagram of a user/UE related data control and/or management procedure, according to an example embodiment. As illustrated in the example of FIG. 3a, at 1, a URDCF may receive a data request(s) from the data consumer to the data source. At 2, when the URDCF becomes aware of a request from a data consumer to a data source, the URDCF may register with a UDM to be notified about changes in the subscription information related to user consent. At 3, the URDCF may log or otherwise keep track of data or analytic requests and data responses that are related to user consent. In an embodiment, the URDCF may also maintain a "validity time" value indicating a duration over which user consent is valid (e.g., from the time the data or analytics was provided to data or analytics consumer).

As also illustrated in the example of FIG. 3a, at 4, a UDM (or data repository that stores subscription information) may determine that the user consent for a user has been revoked or updated. At 5, the UDM may notify the URDCF about the user consent update or revocation. In this notification, the UDM may also provide additional information to the URDCF, e.g., in case the user consent has different details or conditions, such as user consent to use the data for network optimization and/or user consent to for marketing-related analytics.

As further illustrated in the example of FIG. 3a, at 6, based on its records of data/analytics exchanged between the different data consumers and data sources, the URDCF may determine the data consumers to be notified as they had received some data that is affected by the revoked user consent. At 7, the URDCF may request and/or notify to the data consumers determined at 6 to delete any UE data and/or analytics related to the user that has revoked their consent. Also, in an embodiment, the URDCF may update the validity time to indicate its expiry and communicates the same to the data consumer and/or analytics consumer, thus indicating a lack of user consent to the corresponding data/analytics. Optionally, at 8, the data consumers may confirm that the UE related data/analytics have been deleted.

A further embodiment may provide enhanced user consent revocation procedures to include information about "maximum storage time," which may inform the URDCF about how long the data consumer will maximally store or keep the provided data and/or the output analytics derived from the provided data. According to an embodiment, the "maximum storage time" may be provided by the data consumer and/or analytics consumer at procedure 3 of FIG. 3a, so that the URDCF may delete its records about this data request after that maximum storage time has passed. In this embodiment, a revocation of user consent may therefore just be notified to the data consumers (e.g., in procedures 7 of FIG. 3a) that still might keep a copy of the data/analytics as the maximum storage time has not passed.

Figure 3B:
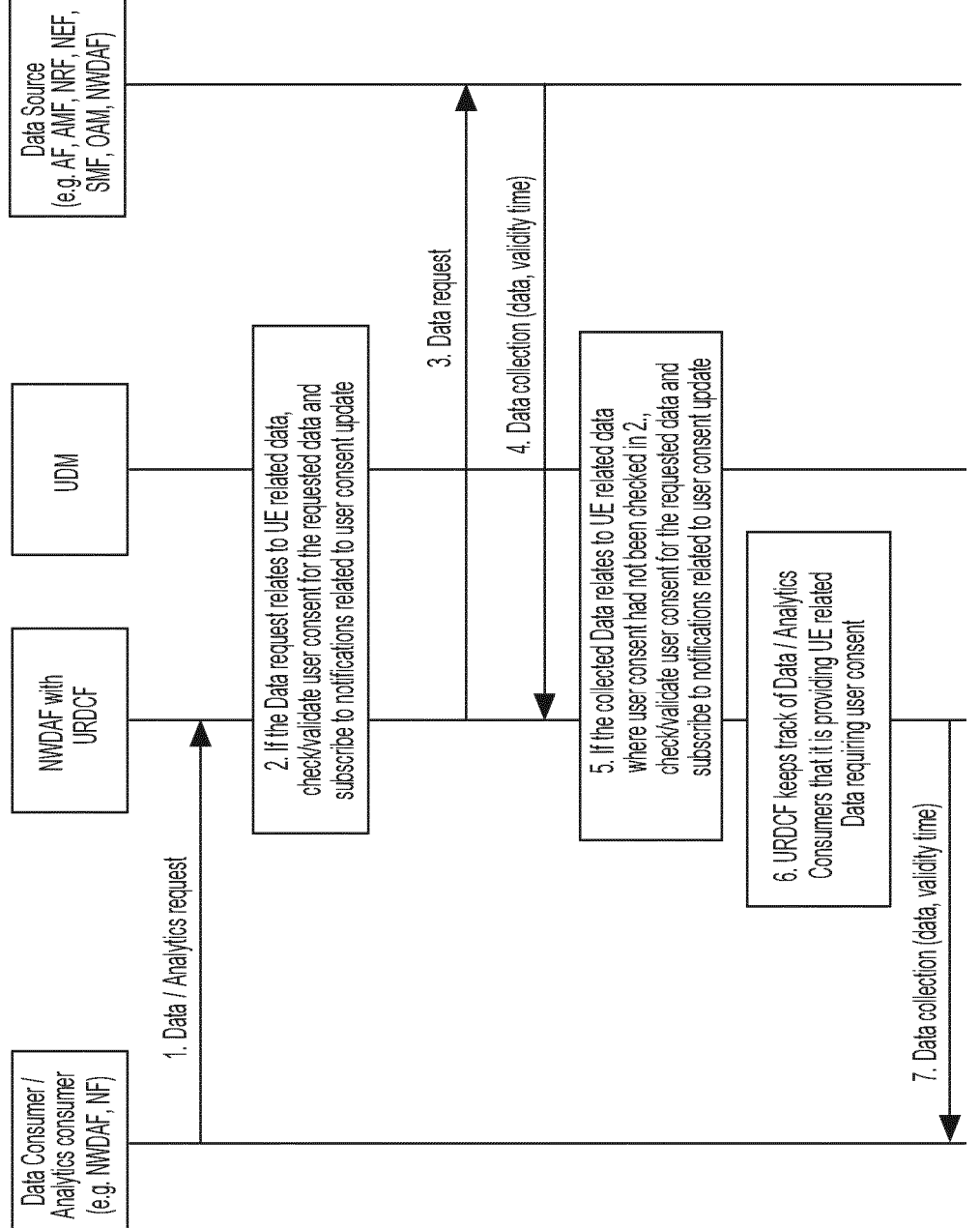
FIG. 3b illustrates an example signaling flow diagram, according to one example embodiment.

FIG. 3b illustrates an example signaling flow diagram of a user/UE related data control and/or management procedure, according to an example embodiment. As illustrated in the example of FIG. 3b, at 1, a data consumer/analytics consumer (e.g. NWDAF or NWDAF service consumer) may send a data/analytics request or data/analytics subscription (e.g., Nnwdaf_AnalyticsInfo_Request or Nnwdaf_AnalyticsSubscription_Subscribe Request) to the NWDAF with URDCF. For instance, in the example of FIG. 3b, the URDCF may be a functionality of the NWDAF. It is noted that, in other example embodiments, the URDCF may be included as a functionality of a NF, DCCF, data source, data consumer, AF, AMF, NRF, NEF, SMF, OAM, and/or other network entity.

As also illustrated in the example of FIG. 3b, at 2, if the requested data is subject to user consent, the URDCF may check whether user consent is available for this request. In some embodiments, the URDCF may already know about the user consent (e.g., from a previous request) or may check with the UDM to learn about the user consent information available in the UDR subscription information. In an embodiment, the URDCF may further subscribe to UDM to receive notifications for the UE or group of UEs related to changes on the user consent information. At 3, if the user consent is available and valid, the NWDAF may send data collection requests/event subscriptions to one or multiple data source(s), e.g., AF(s), AMF, NRF, NEF, SMF, OAM, and/or other NWDAF(s), depending on the input data required for the requested analytics identifier (ID).

In the example of FIG. 3b, at 4, data source(s) may provide the requested data/events to the NWDAF (e.g., as data response or as notifications related to the requested subscription). The response/notify messages may also include a validity time indicating the duration over which the data may be stored/processed. At the expiry of this validity time, any data consumer (including the NWDAF) needs to either delete corresponding data/analytics, or may renegotiate a new validity time with the data source. At 5, if the collected data relates to UE related data, where user consent had not yet been checked in procedure 2, the URDCF may check whether user consent is available for this request. The NWDAF may either already know about the user consent (e.g., from a previous request) or may check with the UDM to learn about the user consent information available in the UDR subscription information.

As also illustrated in the example of FIG. 3b, at 6, if the user consent is available, the URDCF may keep track of data/analytics consumers that the NWDAF is providing UE related data requiring user consent. Therefore, the URDCF may keep a record of the data consumer along with information to identify and contact the data consumer, e.g., by a callback uniform resource identifier (URI) provided by the data consumer. At 7, if the user consent is available and valid, the data source may provide the requested data to the data consumer (e.g., as data response/Nnwdaf_AnalyticsInfo_Request response or as notifications related to the requested subscription). The response/notify message may also include a validity time indicating the duration over which the user consent is valid. At the expiry of this validity time, a data consumer may either delete corresponding data/analytics, or may renegotiate a new validity time.

Figure 3C:
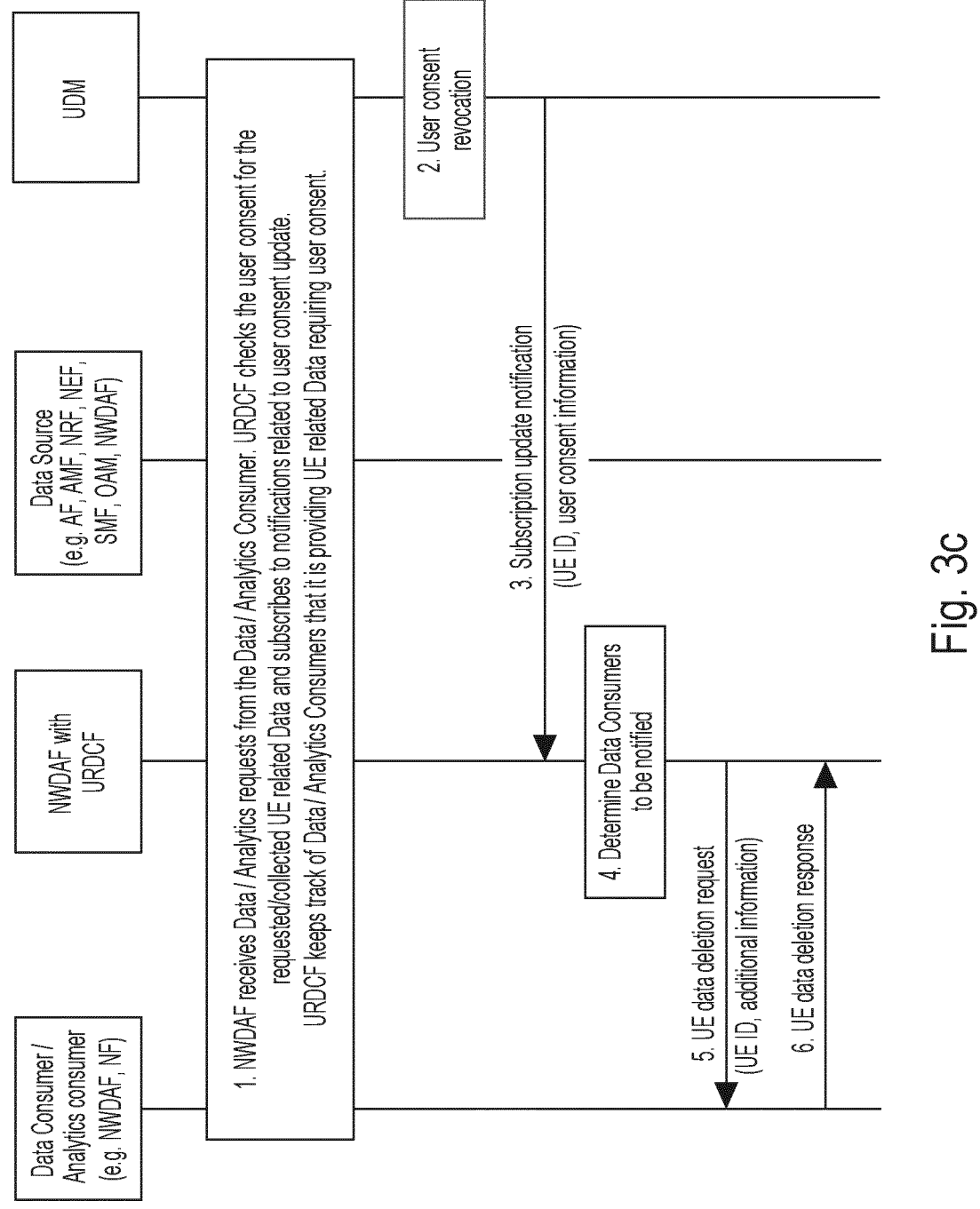
FIG. 3c illustrates an example signaling flow diagram, according to one example embodiment.

FIG. 3c illustrates an example signaling flow diagram of a user/UE related data control and/or management procedure, according to an example embodiment. In particular, FIG. 3c illustrates an example procedure for user consent revocation, according to one example embodiment. As illustrated in the example of FIG. 3c, at 1, a NWDAF may receive data/analytic requests from the data/analytic consumer. In an embodiment, a URDCF of the NWDAF may check the user consent for the requested/collected UE related data. For example, the URDCF may register with a UDM to be notified about changes on the subscription information related to user consent of the affected UE(s). The URDCF may keep track of data/analytics consumers that the NWDAF is providing UE related data requiring user consent.

As further illustrated in the example of FIG. 3c, at 2, the UDM may determine that the user consent for a particular user has been revoked. At 3, the UDM may notify the URDCF about the user consent revocation. At 4, based on its historical records of data/analytics consumers and the data provided to them, the URDCF may determine the data consumers to be notified, e.g., as they had requested some data that is affected by the withdrawn user consent. At 5, the URDCF may request and/or notify to the data consumers determined in procedure 5 to delete any UE data and/or analytics related to the user that has revoked his consent. Optionally, at 6, data consumers may confirm to the URDCF that the UE related data/analytics have been deleted.

Figure 4A:
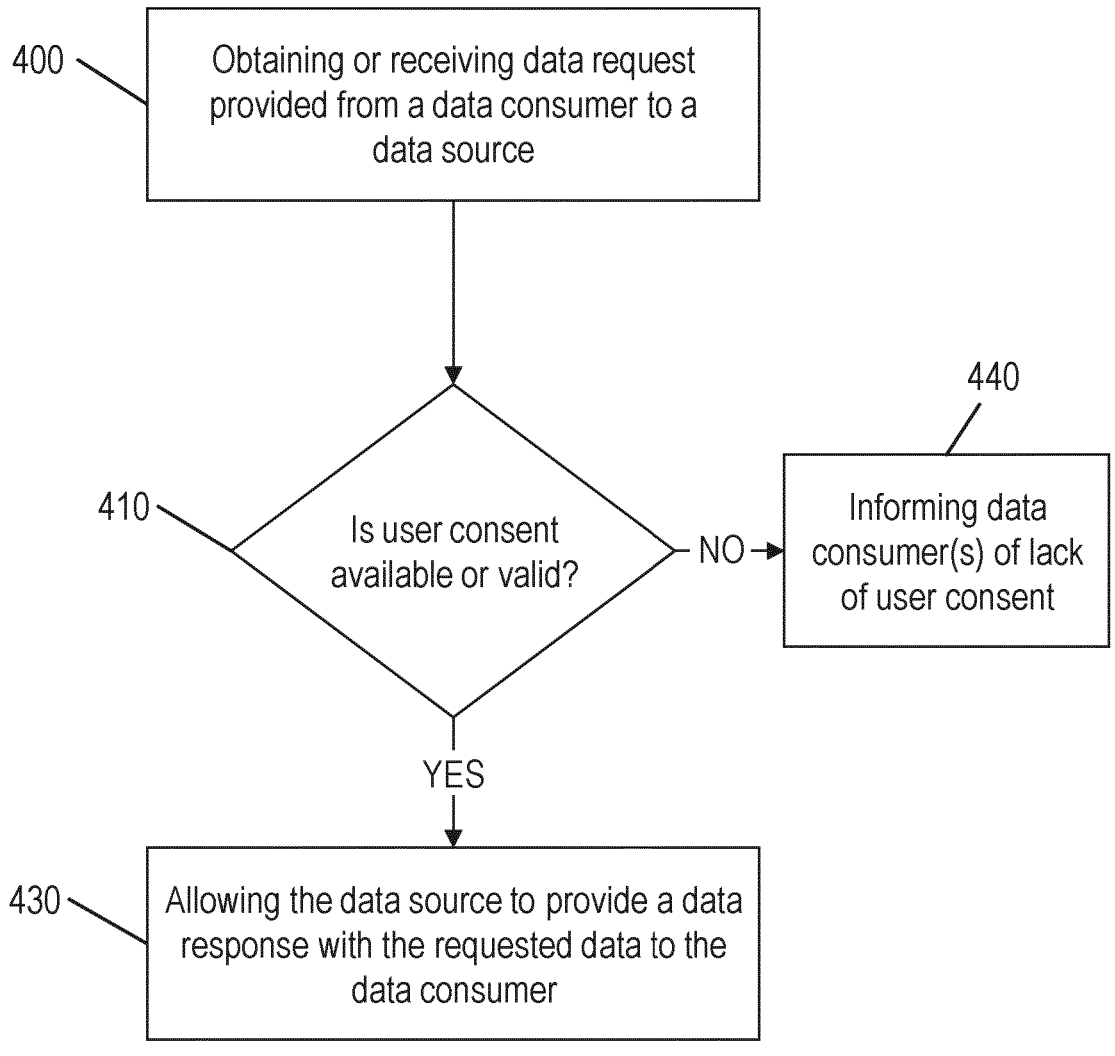
FIG. 4a illustrates an example flow diagram of a method, according to one example embodiment.
Figure 4B:
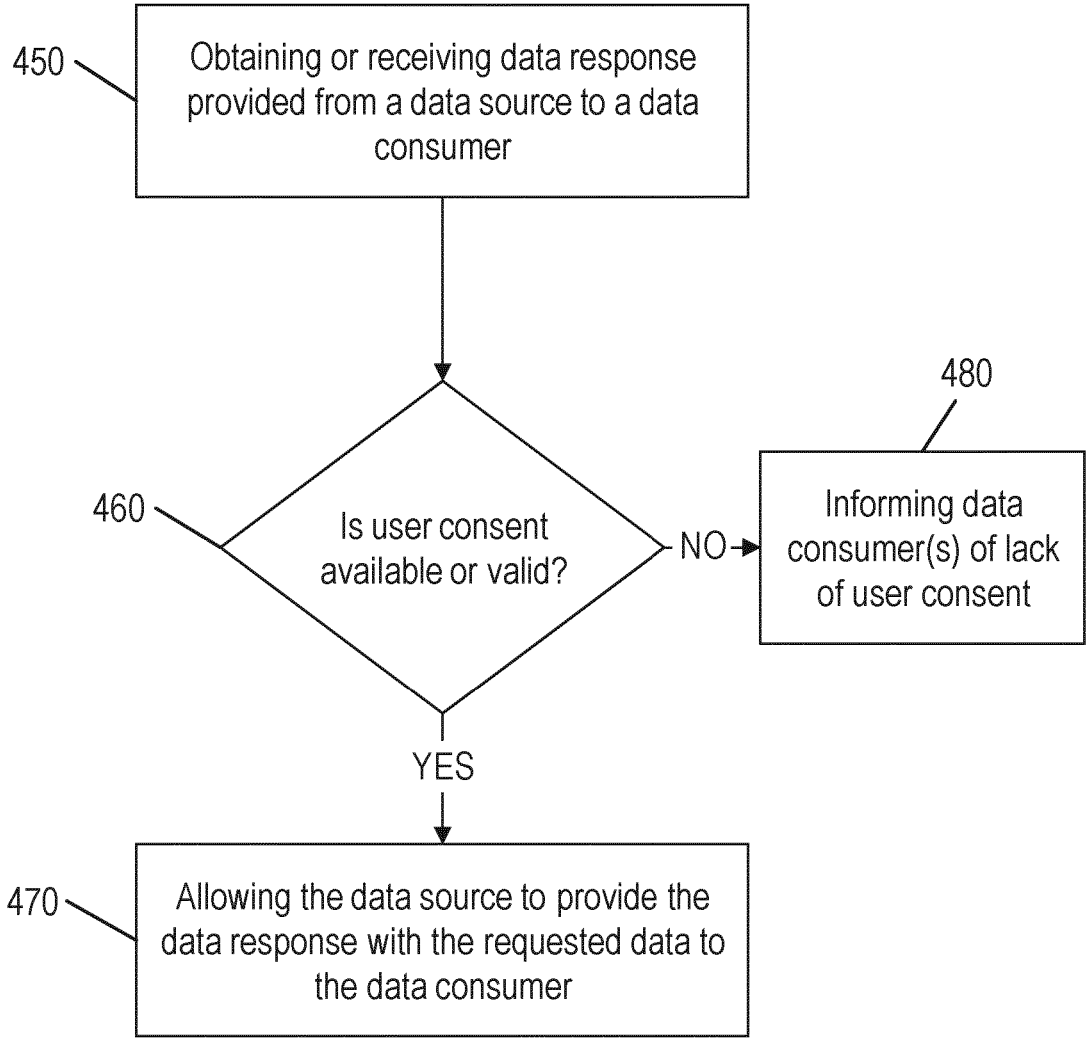
FIG. 4b illustrates an example flow diagram of a method, according to one example embodiment.

FIGS. 4a and 4b illustrates an example flow diagram of a method of user/UE related data control and/or management, according to one example embodiment. In certain example embodiments, the flow diagram of FIGS. 4a and 4b may be performed by a network entity or network node in a communications system, such as LTE or 5G NR. In some example embodiments, the network entity performing the method of FIGS. 4a and 4b may include a control entity or function configured to control or manage user related data, e.g., data that is subject to user consent. For example, in certain embodiments, the control entity may include a URDCF, data source or URDCF co-located with a data source, or the like. Furthermore, in some embodiments, the control entity or its functionality may be performed by or incorporated in one or more of a NF, data source, data consumer, DCCF, NWDAF, AF, AMF, NRF, NEF, SMF, OAM, or other network entity. Thus, in some embodiments, a control entity may be a separate entity or may represent a functionality incorporated into and/or performed by one or more of a NF, data source, data consumer, DCCF, NWDAF, AF, AMF, NRF, NEF, SMF, OAM, or other network entity. For instance, in one example embodiment, the method of FIGS. 4a and 4b may be performed by the URDCF or NWDAF depicted in the example signaling flow diagrams of FIG. 2 or 3.

In an example embodiment, as illustrated in the example of FIG. 4a, a method may include, at 400, obtaining or receiving a data request from a data consumer to a data source. According to one embodiment, the method may optionally include storing a record about data requested in the data request. For example, in certain embodiments, the control entity may be further configured as a proxy on the data request path, on the data response path, and/or on the data collection path, between the data consumer and the data source. In one example embodiment, the control entity may be co-located with a DCCF and/or co-located with a data source.

When the data request is subject to user consent, the method may include obtaining information on whether the user consent is available and/or valid for the user data requested in or associated with the data request. For example, the method may include, at 410, checking or validating whether the user consent is available for the user data requested in the data request. In an embodiment, the checking 410 may include checking based on already obtained knowledge from a previous request and/or based on a handshake procedure with the data source. According to a further embodiment, the checking 410 may include checking with a UDM or data repository to learn about user consent information availability in the subscription information and/or about values of the user consent stored in the UDM or data repository. In one example embodiment, the method may include receiving a notification, from the data consumer or data source, about the requested data or about data that will be provided to the data consumer.

As further illustrated in the example of FIG. 4a, when the user consent is available, the method may include, at 430, allowing the data source to provide a data response with the requested data to the data consumer. For example, the allowing 430 may include forwarding the data request to the data source. In an embodiment, the data response may be proxied via the control entity, and the method may include the control entity storing a record of the data provided in the data response.

According to certain example embodiments, the data response may further include a validity time indicating a duration over which the user consent is valid. In this embodiment, the method may include storing the validity time together with the requested data. Upon the expiry of the validity time, the data source and/or data consumer may be configured to stop transmitting the requested data to the data consumer and/or delete corresponding data and/or analytics, or the method may include renegotiating a new validity time.

In some example embodiments, when it is determined at 410 that user consent is not available or valid, then the method may include, at 440, informing the data consumer about user consent not being available or not being valid, e.g., due to a revocation of the user consent. In an embodiment, when there are past data consumers of the user data, then the informing 440 may include informing those past data consumers of the user consent not being available and/or not being valid. According to an embodiment, the informing 440 may include requesting or notifying the data consumer and/or past data consumers to delete the user related data that is no longer covered by a user consent. In one embodiment, when it is determined at 410 that the user consent is not available, the method may also include dropping the data request from the request path.

As illustrated in the example of FIG. 4b, a method may include, at 450, obtaining or receiving a data response from a data source to a data consumer. According to one embodiment, the method may optionally include storing a record about data provided in the data response. For example, in certain embodiments, the control entity may be further configured as a proxy on the data request path, on the data response path, and/or on the data collection path, between the data consumer and the data source. In one example embodiment, the control entity may be co-located with a DCCF and/or co-located with a data source.

When the data response is subject to user consent, the method may include obtaining information on whether the user consent is available and/or valid for the user data provided in or associated with the data response. For example, the method may include, at 410, checking or validating whether user consent is available for the data response. In an embodiment, the checking 460 may include checking based on already obtained knowledge from a previous response and/or based on a handshake procedure with the data source. According to a further embodiment, the checking 460 may include checking with a UDM or data repository to learn about user consent information availability in the subscription information and/or about values of the user consent stored in the UDM or data repository. In one example embodiment, the method may include receiving a notification, from the data consumer or data source, about the data in the data response or about data that will be provided to the data consumer.

As further illustrated in the example of FIG. 4b, when the user consent is available, the method may include, at 470, allowing the data source to provide the data response with the requested data to the data consumer. For example, the allowing 470 may include forwarding the data response to the data consumer. In an embodiment, the data response may be proxied via the entity configured to track user consent, and the method may include the entity storing a record of the data provided in the data response.

According to certain example embodiments, the data response may further include a validity time indicating a duration over which the user consent is valid. In this embodiment, the method may include storing the validity time together with the requested data. Upon the expiry of the validity time, the data source and/or data consumer may be configured to stop transmitting the requested data and/or delete corresponding data and/or analytics, or the method may include renegotiating a new validity time.

In some example embodiments, when it is determined at 460 that user consent is not available or valid, then the method may include, at 480, informing the data consumer, as well as optionally informing past data consumers, about user consent not being available or not being valid, e.g., due to a revocation of the user consent. According to an embodiment, the informing 480 may include requesting or notifying the data consumer and/or past data consumers to delete the user related data that is no longer covered by a user consent. In one embodiment, when it is determined at 460 that the user consent is not available, the method may also include dropping the data response from the response path.

FIG. 5 illustrates an example flow diagram of a method of user/UE related data control and/or management, according to one example embodiment. In certain example embodiments, the flow diagram of FIG. 5 may be performed by a network entity or network node in a communications system, such as LTE or 5G NR. In some example embodiments, the network entity performing the method of FIG. 5 may include a control entity configured to control or manage user related data, e.g., data that is subject to user consent. For example, the control entity may include a URDCF, data source or URDCF co-located with a data source, or the like. For instance, in one example embodiment, the method of FIG. 5 may be performed by the URDCF depicted in the example signaling flow diagrams of FIG. 2 or 3.

In an example embodiment, as illustrated in the example of FIG. 5, a method may include, at 500, registering with a UDM or data repository to be notified about changes in subscription information related to user consent. According to an embodiment, the method may include, at 510, tracking data requests, analytic requests and/or data responses that are related to the user consent. When requested data (e.g., data requested by a data consumer or analytic consumer or NWDAF) is subject to user consent, the method may include, at 520, checking whether the user consent is available or valid for the requested data. In an embodiment, the checking 520 may include checking based on already obtained knowledge from a previous request and/or based on a handshake procedure with the data source. According to a further embodiment, the checking 520 may include receiving information, from the UDM or data repository, about the user consent information available in the subscription information. In one embodiment, the method may include maintaining a validity time having a value indicating a duration over which the user consent is/was valid (e.g., from the time the data or analytics was provided to data or analytics consumer).

In an embodiment, when the UDM or data repository determines that the user consent for a user has been updated, changed or revoked, the method may include, at 530, receiving a notification from the UDM or data repository, about the user consent update, change or revocation. According to some embodiments, the notification may also include additional information about the user consent including any conditions related to the user consent, such as but not limited to, user consent to use the data for network optimization or user consent for marketing-related analytics.

According to certain embodiments, the method may include, at 540, based on records of data or analytics exchanged between different data consumers and data sources, determining the data consumers to be notified of the user consent update, change or revocation. For example, the determining 540 may include determining the data consumers to be notified based on whether a data consumer had received some data that is affected by the user consent update, change or revocation. In an embodiment, the method may include, at 550, requesting or notifying the determined data consumers to delete UE data and/or analytics related to the user that has revoked, changed or updated their consent. According to certain embodiments, the method may optionally include receiving a confirmation from the data consumer(s) to confirm that the UE related data and/or analytics have been deleted. In an embodiment, the method may include updating the validity time to indicate its expiry and communicating the updated validity time to the data consumer(s) and/or analytics consumer(s), thus indicating a lack of user consent to the corresponding data and/or analytics.

It should be noted that the example embodiments illustrated in FIGS. 4 and 5 may be combined in any suitable manner, according to certain embodiments.

Figures 6A, 6B, 6C:
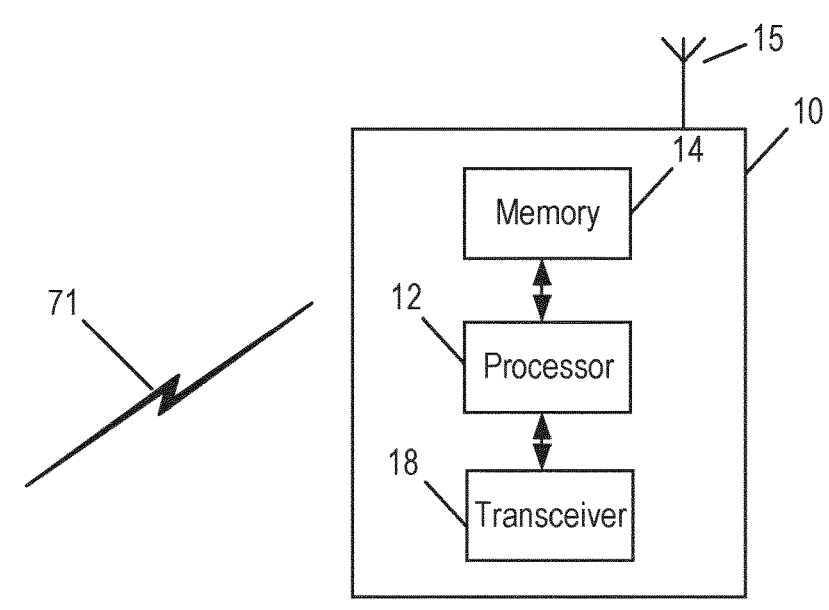
FIG. 6a illustrates an example block diagram of an apparatus, according to one example embodiment.
FIG. 6b illustrates an example block diagram of an apparatus, according to one example embodiment.
FIG. 6c illustrates an example block diagram of an apparatus, according to one example embodiment.

FIG. 6a illustrates an example of an apparatus 10 according to an example embodiment. In an example embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, transmission/reception point (TRP) or gNB in 5G. According to some example embodiments, apparatus 10 may represent a data consumer, analytics consumer, service consumer, NF and/or NWDAF.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6a.

As illustrated in the example of FIG. 6a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources. In certain examples, processor 12 may be configured as a processing means or controlling means for executing any of the procedures described herein.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein. In certain example embodiments, memory 14 may be configured as a storing means for storing any information or instructions for execution as discussed elsewhere herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. In certain example embodiments, transceiver 18 may be configured as a transceiving means for transmitting or receiving information as discussed elsewhere herein. Additionally or alternatively, in some example embodiments, apparatus 10 may include an input and/or output device (I/O device) or means.

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 10 may be a network node or RAN node, such as a base station, access point, Node B, eNB, gNB, WLAN access point, or the like. According to some example embodiments, apparatus 10 may represent a data consumer, analytics consumer, service consumer, NF and/or NWDAF. For example, in some example embodiments, apparatus 10 may be configured to perform one or more of the processes depicted in any of the flow charts or signaling diagrams described herein. More specifically, in certain embodiments, apparatus 10 may be configured to perform any of the procedures performed by the data consumer/analytics consumers in FIGS. 1-3. In some example embodiments, as discussed herein, apparatus 10 may be configured to perform a procedure relating to user/UE related data control and/or management, for instance.

According to certain example embodiments, apparatus 10 may be controlled by memory 14 and processor 12 to transmit a data request and/or receive a data response. In certain embodiments, apparatus 10 may be controlled by memory 14 and processor 12 to notify a control entity configured to control or manage user/UE related data (e.g., URDCF) about requested data. Further, in some embodiments, apparatus 10 may be controlled by memory 14 and processor 12 to receive, from the control entity (e.g., URDCF), a notification when there is a user consent update, change or revocation, e.g., relating to data received or requested by apparatus 10 that is associated with a user that is affected by the revocation, update or change in user consent. As discussed above, a control entity may be a separate entity or may represent a functionality incorporated into and/or performed by one or more of a NF, data source, data consumer, DCCF, NWDAF, AF, AMF, NRF, NEF, SMF, OAM, or other network entity.

FIG. 6b illustrates an example of an apparatus 20 according to another example embodiment. In an example embodiment, apparatus 20 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 20 may be NG-RAN node, an eNB in LTE, or gNB in 5G. According to some example embodiments, apparatus 20 may represent a control entity or node that is configured to control or manage user/UE related data (e.g., URDCF). In certain embodiments, apparatus 20 may be co-located with a DCCF and/or data source, NF, NWDAF, or OAM, for example.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6b.

As illustrated in the example of FIG. 6b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 20 may include an input and/or output device (I/O device). In certain example embodiments, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus

20 may optionally be configured to communicate with apparatus 10 or apparatus 30 via a wireless or wired communications link or interface 70 according to any radio access technology, such as NR.

According to some example embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some example embodiments, apparatus may be network node, access node, or control node, for example. According to certain example embodiments, apparatus 20 may be controlled by memory 24 and processor 22 to perform the functions associated with example embodiments described herein. For example, in some example embodiments, apparatus 20 may be configured to perform one or more of the processes depicted in any of the flow charts or signaling diagrams described herein, such as those illustrated in FIGS. 1-5. In certain example embodiments, apparatus 20 may include or represent a control entity or node configured to control or manage user/UE related data, which may be included in a network function or entity, such as a URDCF, DCCF, NF, NWDAF or OAM. In one example embodiment, apparatus 20 may represent the URDCF illustrated in the example of FIGS. 1-3. According to an example embodiment, apparatus 20 may be configured to perform a procedure relating to user/UE related data control and/or management, e.g., for data subject to user consent, for instance.

In certain example embodiments, apparatus 20 may be controlled by memory 24 and processor 22 to obtain or receive a data request made from a data consumer to a data source. According to one embodiment, apparatus 20 may be controlled by memory 24 and processor 22 to optionally store a record about data requested in the data request. For example, in certain embodiments, apparatus 20 may be further configured as a proxy on the data request path and/or on the data response path between the data consumer and the data source. In one example embodiment, apparatus 20 may be co-located with a DCCF and/or co-located with a data source.

When the data request is subject to user consent, apparatus 20 may be controlled by memory 24 and processor 22 to check or validate whether user consent is available for the data request. In an embodiment, apparatus 20 may be controlled by memory 24 and processor 22 to check based on already obtained knowledge from a previous request and/or based on a handshake procedure with the data source. According to a further embodiment, apparatus 20 may be controlled by memory 24 and processor 22 to check with a UDM or data repository to learn about user consent information available in the subscription information. In one example embodiment, apparatus 20 may be controlled by memory 24 and processor 22 to receive a notification, from the data consumer or data source, about the requested data or about data that will be provided to the data consumer.

In an embodiment, apparatus 20 may be controlled by memory 24 and processor 22 to determine if user consent is available or valid for the data request. When the user consent is available, apparatus 20 may be controlled by memory 24 and processor 22 to allow the data source to provide a data response with the requested data to the data consumer. In an embodiment, the data response may be proxied via the entity configured to track user consent, and apparatus 20 may be controlled by memory 24 and processor 22 to store a record of the data provided in the data response.

According to certain example embodiments, the data response may further include a validity time indicating a duration over which the user consent is valid. In this embodiment, apparatus 20 may be controlled by memory 24 and processor 22 to store the validity time together with the requested data. Upon the expiry of the validity time, the data source and/or data consumer may be configured to stop and/or delete corresponding data and/or analytics, or apparatus 20 may be controlled by memory 24 and processor 22 to renegotiate a new validity time.

In some example embodiments, when it is determined that user consent is not available or valid, then apparatus 20 may be controlled by memory 24 and processor 22 to inform the data consumer, as well as optionally informing past data consumers, about a revocation of the user consent. According to an embodiment, apparatus 20 may be controlled by memory 24 and processor 22 to request or notify the data consumer and/or past data consumers to delete the user related data that is no longer covered by a user consent.

According to a further embodiment, apparatus 20 may be controlled by memory 24 and processor 22 to register with a UDM or data repository to be notified about changes in subscription information related to user consent. According to an embodiment, apparatus 20 may be controlled by memory 24 and processor 22 to track data requests, analytic requests and/or data responses that are related to the user consent. When requested data (e.g., data requested by a data consumer or analytic consumer or NWDAF) is subject to user consent, apparatus 20 may be controlled by memory 24 and processor 22 to check whether the user consent is available or valid for the requested data. In an embodiment, apparatus 20 may be controlled by memory 24 and processor 22 to check for the user consent based on already obtained knowledge from a previous request and/or based on a handshake procedure with the data source. According to a further embodiment, apparatus 20 may be controlled by memory 24 and processor 22 to receive information, from the UDM or data repository, about the user consent information available in the subscription information. In one embodiment, apparatus 20 may be controlled by memory 24 and processor 22 to maintain a validity time having a value indicating a duration over which the user consent is/was valid (e.g., from the time the data or analytics was provided to data or analytics consumer).

In an embodiment, when the UDM or data repository determines that the user consent for a user has been updated, changed or revoked, apparatus 20 may be controlled by memory 24 and processor 22 to receive a notification, from the UDM or data repository, about the user consent update, change or revocation. According to some embodiments, the notification may also include additional information about the user consent including any conditions related to the user consent, such as but not limited to, user consent to use the data for network optimization or user consent for marketing-related analytics.

According to certain embodiments, apparatus 20 may be controlled by memory 24 and processor 22 to, based on records of data or analytics exchanged between different data consumers and data sources, determine the data consumers to be notified of the user consent update, change or revocation. For example, apparatus 20 may be controlled by memory 24 and processor 22 to determine the data consumers to be notified based on whether a data consumer had received some data that is affected by the user consent update, change or revocation. In an embodiment, apparatus 20 may be controlled by memory 24 and processor 22 to request or notify the determined data consumers to delete UE data and/or analytics related to the user that has revoked, changed or updated their consent. According to certain embodiments, apparatus 20 may be controlled by memory 24 and processor 22 to optionally receive a confirmation from the data consumer(s) to confirm that the UE related data and/or analytics have been deleted. In an embodiment, apparatus 20 may be controlled by memory 24 and processor 22 to update the validity time to indicate its expiry and communicating the updated validity time to the data consumer(s) and/or analytics consumer(s), thus indicating a lack of user consent to the corresponding data and/or analytics.

FIG. 6c illustrates an example of an apparatus 30 according to another example embodiment. In an example embodiment, apparatus 30 may be a node, host, or server in a communications network or serving such a network. For example, apparatus 30 may be a satellite, base station, a Node B, an evolved Node B (eNB), 5G Node B or access point, next generation Node B (NG-NB or gNB), access node, control node, and/or WLAN access point, associated with a radio access network, such as a LTE network, 5G or NR. In example embodiments, apparatus 30 may be NG-RAN node, an eNB in LTE, transmission/reception point (TRP) or gNB in 5G. According to some example embodiments, apparatus 30 may represent a data source, NF, NWDAF, AF, AMF, NRF, NEF, SMF, or OAM, for instance.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 6c.

As illustrated in the example of FIG. 6c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 6c, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a network node, such as a data source, NF, NWDAF, or OAM, for instance. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein. As an example, apparatus 30 may correspond to or represent a data source illustrated in the example of FIGS. 1-3. According to certain example embodiments, apparatus 30 may be configured to perform a procedure relating to user/UE related data control and/or management, e.g., for data requiring user consent, for instance.

According to an example embodiment, apparatus 30 may be controlled by memory 34 and processor 32 to receive a data request and/or transmit a data response. In certain embodiments, apparatus 30 may be controlled by memory 34 and processor 32 to notify an entity configured to control or manage user/UE related data (e.g., URDCF) about user-related data provided to a data consumer. According to some embodiments, when data requested in a data request is subject to user consent, apparatus 30 may be controlled by memory 34 and processor 32 to check whether the user consent is available or valid for the data request. In an embodiment, apparatus 30 may be controlled by memory 34 and processor 32 to provide the requested data when the user consent is available.

Furthermore, it should be noted that an apparatus, according to certain example embodiments, may include means or functions for performing any of the procedures described herein.

Therefore, certain example embodiments provide several technological improvements, enhancements, and/or advantages over existing technological processes and constitute an improvement at least to the technological field of wireless network control and management. For example, as discussed in detail in the foregoing, certain example embodiments provide methods for managing and tracking user consent changes or revocation. Accordingly, example embodiments can improve the collection, validation and checking of user consent to process UE related data. Further, certain embodiments are able to prevent network entities from processing data based on outdated information about user consent. As such, some embodiments may reduce unnecessary processing or signaling. Thus, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A network apparatus, comprising:

at least one processor; and at least one memory comprising computer program code, the at least one memory and the computer program code configured, with the at least one processor, to cause the network apparatus at least to:

control or manage user related data;

register with a unified data management (UDM) or data repository to be notified about changes in subscription information related to user consent;

track data requests, analytic requests, and data responses that are related to the user consent;

obtain or receive a data request from a data consumer, the data request configured to target a data source;

store a record about data requested in the data request;

check a validity of the user consent by checking with the UDM or data repository to learn about user consent information availability in subscription information, and values of the user consent stored in the UDM or data repository;

obtain, based on the data request being subject to user consent, information on whether the user consent is available for user data requested in the data request and valid for user data requested in the data request, wherein the information is obtained by checking the validity of the user consent based on already obtained knowledge from a previous request and a handshake procedure with the data source;

allow, based on the user consent being available and valid, the data source to provide a data response with the requested data to the data consumer, serve as a proxy for the data response;

wherein the data response comprises a validity time indicating a duration over which the user consent is valid;

store the validity time together with the requested data, receive, from the data consumer or the data source, a notification about the requested data or about data that was provided to the data consumer;

store a record of the data provided in the data response;

receive a notification from the UDM or data repository that the user consent has been updated, changed or revoked by a user, wherein the notification includes information about conditions related to the user consent;

determine whether the data consumer is to be notified of the user consent update, change or revocation based on whether the data consumer had received some data that is affected by the user consent update, change or revocation;

upon determining that the data consumer is to be notified of the user consent update, change or revocation, notify the data consumers to delete data related to the user that has revoked, changed or updated their consent;

receive a confirmation from the data consumer to confirm that the data related to the user that has revoked, changed or updated their consent has been deleted; and update the validity time, wherein the network apparatus comprises a network function (NF), a first data source, a data consumer, a first data collection coordination function (DCCF), a network data analytics function (NWDAF), and a user related data controlling function (URDCF), wherein the network apparatus is configured as a proxy on a data request path, a proxy on a data response path, and a proxy on a data collection path between the data consumer and the data source, and wherein the network apparatus is co-located with a second DCCF and a second data source.

* * * * *